(12) United States Patent
Kuppannan et al.

(10) Patent No.: US 11,095,614 B2
(45) Date of Patent: Aug. 17, 2021

(54) CONFIGURING HOSTNAME BASED FIREWALL POLICIES

(71) Applicant: COLORTOKENS, INC., Santa Clara, CA (US)

(72) Inventors: Jayaraghavendran Kuppannan, Santa Clara, CA (US); Deepak Kushwaha, Santa Clara, CA (US); Natarajan Venkataraman, Santa Clara, CA (US); Puneet Tutliani, Santa Clara, CA (US)

(73) Assignee: COLORTOKENS, INC., Santa Clara, CA (US)

( * ) Notice: Subject to any disclaimer, the term of this patent is extended or adjusted under 35 U.S.C. 154(b) by 274 days.

(21) Appl. No.: 16/412,219

(22) Filed: May 14, 2019

(65) Prior Publication Data
US 2020/0366648 A1 Nov. 19, 2020

(51) Int. Cl.
*G06F 17/00* (2019.01)
*H04L 29/06* (2006.01)

(52) U.S. Cl.
CPC ...... *H04L 63/0263* (2013.01); *H04L 63/0236* (2013.01)

(58) Field of Classification Search
CPC ............. H04L 63/0263; H04L 63/0236; H04L 61/1511
See application file for complete search history.

(56) References Cited

U.S. PATENT DOCUMENTS

| 7,684,394 | B1* | 3/2010 | Cutbill | H04L 29/12066 370/389 |
| 8,549,609 | B2* | 10/2013 | Horman | H04L 61/2076 726/11 |
| 9,882,868 | B1* | 1/2018 | Williams | H04L 41/0893 |
| 10,298,543 | B2* | 5/2019 | Glenn | H04L 63/08 |
| 10,749,901 | B2* | 8/2020 | Glenn | H04L 63/20 |
| 10,951,582 | B2* | 3/2021 | Gurney | H04L 63/101 |

* cited by examiner

*Primary Examiner* — Amie C. Lin
(74) *Attorney, Agent, or Firm* — Barry Choobin; Patent 360LLC (57) ABSTRACT

A hostname based access configuration system (HNACS) is provided for configuring a host-based firewall to implement firewall policies referencing hostnames. The HNACS defines a hostname based firewall policy (HNFP) referencing a host server using a corresponding hostname instead of an internet protocol (IP) address. The HNACS incorporates the HNFP onto the host-based firewall but renders the HNFP non-implementable on the computing device until a domain name system (DNS) query is generated. If the DNS query includes the hostname in the HNFP, the HNACS determines a mapping between the hostname specified in the DNS query and an IP address corresponding to the hostname (obtained via a DNS response corresponding to the DNS query). Based on the mapping, the HNFP is transformed via an implicit replacement of the hostname in the HNFP with the IP address of the host server, thereby rendering the HNFP executable on the host-based firewall.

17 Claims, 4 Drawing Sheets

CONFIGURING HOSTNAME BASED FIREWALL POLICIES

BACKGROUND

Technical Field

The computer-implemented method and the system disclosed herein, in general, relate to the implementation of a hostname-based firewall policy. More particularly, the computer-implemented method and the system disclosed herein relate to configuring a host-based firewall installed on a computing device to implement firewall policies incorporating hostnames instead of IP addresses.

Description of Related Art

In a computing environment, a firewall typically monitors network traffic and protects networks from unauthorized access by blocking unauthorized communications, while permitting authorized communications to pass through the firewall. Communications entering or leaving an internal network pass through the firewall, which examines each communication and blocks those communications that do not meet predefined security criteria. The firewall, therefore, is a network security system comprising software components, or hardware components, or a combination of software and hardware components installed on a computing device, that facilitates secured network access. The firewall establishes a barrier between a trusted internal network of resources and an untrusted external network, for example, the internet, that connects the resources to multiple host servers. Firewalls can be integrated into operating systems of computing devices, for example, computers, mobile devices, smartphones, tablet computing devices, network-enabled computing devices, and the like. Firewalls can also be executed as software, for example, on computer servers, gateways, network devices such as network routers, data appliances such as security appliances and the like.

Firewalls typically allow or deny network communications based on sets of firewall rules that constitute firewall policies. For example, a firewall can filter inbound and outbound network traffic by applying a predetermined firewall policy. Firewalls are often categorized as network firewalls or host-based firewalls. Network firewalls are executed on the network hardware and filter traffic between two or more networks. Host-based firewalls are executed on host resources comprising for example, computing devices, and control network traffic in and out of those host resources. Host-based firewalls are used extensively to control, that is, allow or deny access to multiple entities in a network. Firewall rules in a firewall policy are typically configured based on (at least one of) a source IP address, a destination IP address, a port, and a protocol combination. However, most entities are identified by hostnames. By default, hostnames are typically used to access websites. Websites are accessed using uniform resource locators (URLs) that internally contain hostnames. Typically, host servers of websites are identified by IP addresses; however, since it is difficult for users to remember the IP addresses, hostnames are used to identify the websites and in turn the corresponding host servers. A hostname is, while not necessary, is typically selected to relate to the purpose of a website.

Most enterprises have started using micro-segmented networks by configuring granular firewall policies at every computing device which allow only specific and restricted access from computing devices to host servers. Since firewall policies typically use the IP address as one of the criteria for filtering the data packets, there is always a need to supply IP addresses (source IP address and destination IP address) for configuring a firewall policy. However, users may want the flexibility to configure a firewall policy based on hostnames, instead of the IP addresses, for multiple reasons such as ease of use, the IP addresses not being fixed for host servers, the host servers being referenced by multiple IP addresses, and the like. Therefore, there is felt a need for configuring firewall rules, and in turn firewall policies, based on the hostnames than on IP addresses.

Many firewalls do not support a hostname based configuration. In cases where firewalls support the hostname based configuration, these firewalls do not resolve the hostname to an IP address periodically based on expiry time, resulting in stale entries and blocked connections. For example, in Ubuntu® software implementation, iptables support configuration of a hostname in a firewall rule, but the iptables resolve the hostname to an IP address immediately at the time of application of the firewall rule. And, during a subsequent call to a Domain Name System (DNS) server by an application requesting to connect to the DNS server represented by the hostname, the DNS server may resolve the hostname to a different IP address. Therefore, when the application initiates a connection to a host server based on the IP address the application obtained, the application will be blocked due to the iptable containing a different IP address for the host server. Furthermore, iptables do not track the expiry time of the IP address provided by the DNS server and therefore do not update the IP address. Lack of an updated IP address could again lead to the application being blocked from accessing the website despite the user who configured the firewall rule having no such intention.

Moreover, a DNS server may return different IP addresses for the same hostname in subsequent DNS queries or lookups as the DNS server typically rotates the IP addresses of the host servers to enable and support load balancing on the host server. The phenomenon of load balancing distributes workloads uniformly across servers, or other computer-based resources to optimize network capacity. Some DNS servers also return different IP addresses for the same hostname depending on a geographical location from where the DNS query originates and accordingly direct a client application on a computing device to a host server proximal to the geographical location. Furthermore, a mapping between a hostname and an IP address is time-based and expires after a time period specified in a DNS response received from the DNS server. These issues make configuring policies based on hostnames challenging. When immune or domain suffix-based filtering is required, conventional solutions implement expensive Deep Packet Inspection (DPI) technologies, where contents of HyperText Transfer Protocol (HTTP) packets are inspected to understand the host server requested access to and to apply an action defined by a policy deemed appropriate. In the case of the HyperText Transfer Protocol Secure (HTTPS), conventional solutions inspect the secure sockets layer (SSL) certificate to determine the host server requested access to. Therefore, there is a need for IP-level firewalls that support hostnames as part of the firewall policies.

Hence, there is a long-felt need for a computer-implemented method and, a system that facilitates configuration of hostname based firewall policies. There is also felt a need for a system and method that enables users to configure firewall policies using hostnames instead of the IP address. Moreover, there is a need for a computer-implemented method and a system that ensures that a correct IP address to hostname mapping is configured in the hostname-based firewall to allow applications obtain correct access to a host server referenced by the hostname.

Objects

An object of the computer-implemented method and the system disclosed herein is to configure a host-based firewall installed on a computing device to implement firewall policies referencing hostnames instead of internet protocol (IP) addresses.

Another object of the computer-implemented method and the system disclosed herein is to define at least one hostname based firewall policy referencing a host server using a corresponding hostname instead of an IP address assigned to the host server.

Another object of the computer-implemented method and the system disclosed herein is to determine, based on a domain name system (DNS) response to a DNS query from a DNS server, a mapping between the hostname specified in the DNS query and an IP address corresponding to the hostname.

Another object of the computer-implemented method and the system disclosed herein is to transform the hostname based firewall policy based on the mapping between the hostname and the IP address corresponding to the hostname, by implicitly replacing the hostname incorporated within the hostname based firewall policy with the IP address assigned to the host server.

Another object of the computer-implemented method and the system disclosed herein is to store the mapping between the hostname specified in the DNS query and the IP address corresponding to the hostname, and a time-to-live value assigned to the mapping, in a local cache of the computing device.

Another object of the computer-implemented method and the system disclosed herein is to determine whether the hostname incorporated within the hostname based firewall policy is mapped to multiple destination IP addresses corresponding to respective host servers, and to subsequently store each mapping between the hostname and each of the destination IP addresses, in the local cache, along with a time-to-live value assigned to each mapping.

Another object of the computer-implemented method and the system disclosed herein is to remove the IP address assigned to the host server from the hostname based firewall policy on the expiration of time defined by the time-to-live value assigned to the mapping between the hostname specified in the DNS query and the IP address corresponding to the hostname.

Another object of the computer-implemented method and the system disclosed herein is to periodically verify the mapping between the hostname specified in the DNS query and the IP address corresponding to the hostname, to identify and provide access to a correct host server by implicitly replacing the hostname (incorporated within the hostname based firewall policy) with an IP address assigned to the correct host server.

SUMMARY

The computer-implemented method and the system disclosed herein address the above-recited need for configuring a host-based firewall installed on a computing device to implement firewall policies referencing hostnames instead of internet protocol (IP) addresses. The computer-implemented method and the system disclosed herein also ensures that a correct IP address mapping to a hostname is configured in the host-based firewall to allow applications obtain correct access to a host server referenced by the hostname. The computer-implemented method disclosed herein employs a hostname based access configuration system (HNACS) and at least one processor configured to execute computer program instructions for configuring a host-based firewall installed on a computing device to implement firewall policies referencing hostnames instead of the IP addresses.

In the computer-implemented method disclosed herein, the HNACS defines at least one hostname based firewall policy referencing a host server using a corresponding hostname instead of an IP address assigned to the host server. In an embodiment, the definition of the hostname based firewall policy comprises referencing the host server using a combination of the hostname and a predetermined regular expression. The predetermined regular expression is used for determining a range of hostnames referenced by the hostname based firewall policy. The HNACS updates the host-based firewall installed on the computing device by incorporating the hostname based firewall policy onto the host-based firewall. The HNACS renders the hostname based firewall policy non-implementable on the computing device until the computing device generates a domain name system (DNS) query requesting access to the host server referenced by the hostname based firewall policy.

On initiation of the DNS query from the computing device, the HNACS intercepts the DNS query and determines whether the intercepted DNS query comprises the hostname incorporated within the hostname based firewall policy and referencing the host server. On determining that the intercepted DNS query comprises the hostname incorporated within the hostname based firewall policy for referencing the host server, the HNACS passes the intercepted DNS query to a DNS server and intercepts a DNS response received from the DNS server in response to the intercepted DNS query. The HNACS resolves the intercepted DNS response, and determines, based on the intercepted DNS response, a mapping between the hostname specified in the intercepted DNS query and an IP address corresponding to the hostname, where the IP address is a destination IP address assigned to the host server. Based on the mapping between the hostname and the IP address corresponding to the hostname, the HNACS transforms the hostname-based firewall policy by implicitly replacing the hostname incorporated therein with the IP address assigned to the host server, thereby rendering the hostname based firewall policy executable on the host-based firewall installed on the computing device, and allowing the host-based firewall to implement the hostname based firewall policy, the way a well-known (prior-art) host-based firewall policy would have been implemented.

In an embodiment, the HNACS stores the mapping between the hostname specified in the intercepted DNS query and the IP address corresponding to the hostname, and a time-to-live (TTL) value assigned to the mapping, in a local cache of the computing device. The HNACS determines whether the hostname incorporated within the hostname based firewall policy is mapped to multiple destination IP addresses corresponding to respective host servers. The HNACS subsequently stores each mapping between the hostname and each of the destination IP addresses, in the local cache, along with a value assigned to each mapping. In another embodiment, the HNACS removes the IP address assigned to the host server from the hostname based firewall policy on the expiration of time defined by the TTL value assigned to the mapping between the hostname specified in the intercepted DNS query and the IP address corresponding to the hostname. In another embodiment, the HNACS periodically verifies the mapping between the hostname specified in the intercepted DNS query and the IP address corresponding to the hostname to identify and provide access to a correct host server by implicitly replacing the hostname incorporated within the hostname based firewall policy with an IP address assigned to the correct host server.

BRIEF DESCRIPTION OF THE DRAWINGS

The foregoing summary, as well as the following detailed description, is better understood when read in conjunction with the appended drawings. For illustrating the computer-implemented method and the system disclosed herein, exemplary constructions of the computer-implemented method and the system disclosed herein are shown in the drawings. However, the computer-implemented method and the system disclosed herein are not limited to the specific methods and components disclosed herein. The description of a method step or a component referenced by a numeral in a drawing applies to the description of that method step or component shown by that same numeral in any subsequent drawing herein.

DETAILED DESCRIPTION

Figure 1:
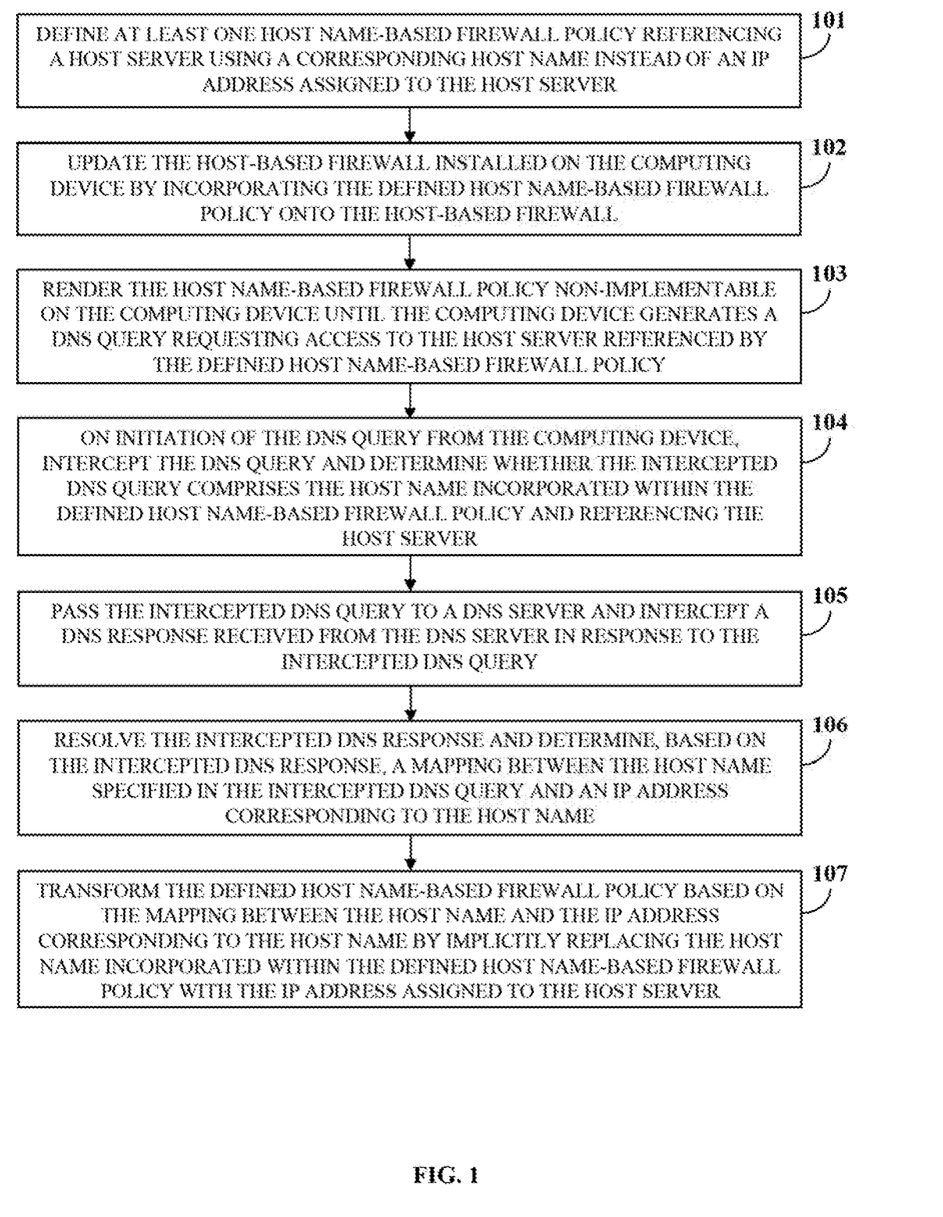
FIG. 1 illustrates a computer-implemented method for configuring a host-based firewall installed on a computing device to implement firewall policies referencing hostnames.

FIG. 1 illustrates a computer-implemented method for configuring a host-based firewall installed on a computing device to implement firewall policies referencing hostnames. As used herein, "host-based firewall" refers to a firewall that runs on a computing device connected to a network, for example, the internet. The host-based firewall protects the computing device from viruses and malware and controls the spread of malware attacks throughout the network. Hostnames are typically assigned to host servers connected to the network and are used for identifying the respective host servers in different forms of electronic communication. A hostname distinguishes one host server from another host server in the network. A suffix of the hostname that represents a domain name system (DNS) domain is referred to as a "domain suffix." In computer networking, a hostname is also referred to as a domain name when a host-specific label is appended with the domain suffix and separated from the domain suffix with a period or a dot. For example, in the hostname "google.com," "Google" is the host-specific label and ".com" is the domain suffix. A fully qualified domain name (FQDN) refers to a hostname of a host server on the internet, where the domain name is completely specified. The FQDN can be resolved via a DNS server. The FQDN contains a hostname and a domain name including a top-level domain as [hostname], [domain], [top-level domain]. For example, "mail.google.com" refers to Google mail servers. Hostnames that include the domain names are stored in a DNS server together with internet protocol (IP) addresses of the respective host servers they reference for mapping the hostnames to the corresponding IP addresses or vice versa. As used herein, a "hostname" also refers to a "domain name" or a "fully qualified domain name" or a "domain suffix." Allowing a domain suffix is the same as allowing traffic to all host servers that have the domain suffix as part of their hostname. Also, as used herein, "firewall policy" refers to a set of firewall rules that define how inbound and outbound network traffic should be handled for specific IP addresses, address ranges, protocols, applications, and the like. The firewall rules of the firewall policy define what IP protocols to pass, appropriate source and destination IP addresses to be used, appropriate ports to be accessed, particular internet control message protocol (ICMP) types and codes to be used, and the like. The host-based firewall will block the inbound and outbound network traffic that is not expressly permitted by the firewall policy.

The computer-implemented method disclosed herein employs a hostname based access configuration system (HNACS) and at least one processor configured to execute computer program instructions for configuring a host-based firewall installed on a computing device to implement firewall policies referencing hostnames. In the computer-implemented method disclosed herein, the HNACS defines 101 at least one hostname based firewall policy referencing a host server using a corresponding hostname instead of an internet protocol (IP) address assigned to the host server. The hostname assigned to the host server is configured in each of the firewall rules of the hostname based firewall policy. The HNACS provides a graphical user interface (GUI) for allowing a user to configure firewall rules of the hostname based firewall policy that allow access between resources such as computing devices and entities such as host servers referenced by hostnames for access using ports and protocols. The data inputted by the user, for example, the entries for the firewall rules, via die GUI, is transformed, processed and executed by an algorithm in the HNACS for configuring a host-based firewall installed on the computing device to implement firewall policies referencing hostnames.

In an embodiment, the definition of the hostname based firewall policy comprises referencing the host server using a combination of the hostname and a predetermined regular expression. The regular expression is a sequence of characters that define a search pattern. In an example, the regular expression character "caret" represented by "^" as the first character means that the pattern starts with the text that follows the caret. ^host1\.ca\.com$ matches host1.ca.com. host1\.ca\.com$ without the preceding caret (^) searches for every host with a name that ends with host1.ca.com. The predetermined regular expression is used for determining a range of hostnames referenced by the hostname based firewall policy. The HNACS matches hostnames found in DNS requests with hostname inputs from a user using regular expressions or other suitable data structures. A user can input hostnames that allow a computing device to allow access to multiple portals through a single input. For example, an input from a user requesting for access to "*.microsoft.com" means access should be given to "os.microsoft.com," "laptops.microsoft.com," and a host of other websites which end with ".microsoft.com." Typically, regular expressions parse through an input string to determine whether the string matches the pattern. In another example, a company wanting to block "FACEBOOK®" can add a firewall rule to the hostname based firewall policy to block network traffic to any host server referenced by "*.facebook.com." The HNACS computes the hostname based firewall policy based on the definition provided by a user, converts the hostname based firewall policy into a resource specific hostname based firewall policy specific to a resource, for example, a computing device, and delivers the resource-specific hostname based firewall policy to the computing device to be applied at the host-based firewall of the computing device. The resource-specific hostname-based, firewall policy contains the hostnames from or to which access should be granted from the computing device.

On receiving the hostname based firewall policy, the HNACS updates 102 the host-based firewall installed on the computing device by incorporating the hostname based firewall policy onto the host-based firewall. The HNACS provides at least one graphical user interface (GUI) on the computing device to allow a user to incorporate the hostname based firewall policy onto the host-based firewall. The HNACS renders 103 the hostname based firewall policy non-implementable on the computing device until the computing device generates a domain name system (DNS) query requesting access to the host server referenced by the hostname based firewall policy. On initiation of the DNS query from the computing device to a DNS server, the HNACS intercepts 104 the DNS query and determines whether the intercepted DNS query comprises the hostname incorporated within the hostname based firewall policy and referencing the host server. On determining that the intercepted DNS query comprises the hostname incorporated within the hostoame based firewall policy for referencing the host server, the HNACS passes 105 the intercepted DNS query to a DNS server and intercepts a DNS response received from the DNS server in response to the intercepted DNS query. The DNS response sent by the DNS server to the computing device comprises the IP address corresponding to the hostname referencing the host server.

The HNACS resolves 106 the intercepted DNS response, and determines based on the intercepted DNS response, a mapping between the hostname specified in the intercepted DNS query and an IP address corresponding to the hostname, where the IP address is a destination IP address assigned to the host server. Since the hostname based firewall policy configured by the user comprises hostnames instead of IP addresses, the HNACS converts the hostnames into IP addresses. Based on the mapping between the hostname and the IP address corresponding to the hostname, the HNACS transforms 107 the hostname based firewall policy by implicitly replacing the hostname incorporated therein with the IP address assigned to the host server, thereby rendering the hostname based firewall policy executable on the host-based firewall, and thereby allowing the host-based firewall to implement the hostname based firewall policy the way a well-known (prior-art) host-based firewall policy would have been implemented. In the transformation of the hostname based firewall policy, the HNACS incorporates a source IP address assigned to the computing device in the hostname based firewall policy. In an embodiment, the HNACS includes port, protocol, and direction of traffic assigned to the computing device in each firewall rule of the hostname based firewall policy. After transformation, the HNACS replaces the firewall policy running on the host-based firewall with the hostname based firewall policy. In an embodiment, during the deployment of the hostname based firewall policy on the conventional host-based firewall, the HNACS executes policy editing commands comprising, for example, inserting a new firewall rule, appending a new firewall rule at the end, deleting a firewall rule, and moving a firewall rule from one position to another position are defined in the hostname based firewall policy on the host-based firewall.

In an embodiment, the HNACS stores the mapping between the hostname specified in the intercepted DNS query and the IP address corresponding to the hostname, and a time-to-live value (TTL) assigned to the mapping, in a local cache of the computing device. In another embodiment, the HNACS removes the IP address assigned to the host server from the hostname based firewall policy on the expiration of time defined by the TTL value assigned to the mapping between the hostname specified in the intercepted DNS query and the IP address corresponding to the hostname. In another embodiment, the HNACS determines whether the hostname incorporated within the hostname based firewall policy is mapped to multiple destination IP addresses corresponding to respective host servers. The HNACS subsequently stores each mapping between the hostname and each of the destination IP addresses, in the local cache, along with a TTL value assigned to each mapping. In another embodiment, the HNACS periodically verifies the mapping between the hostname specified in the intercepted DNS query and the IP address corresponding to the hostname to identify and provide access to a correct host server by implicitly replacing the hostname incorporated within the hostname based firewall policy with an IP address assigned to the correct host server. The HNACS ensures that the hostname to IP address mapping is periodically checked to evaluate and provide access to the correct host server by configuring the correct IP address. Since the HNACS uses the IP address resolved as a part of the DNS query, the HNACS configures the correct IP address in the firewall rule of the hostname based firewall policy, thereby allowing a data packet to pass through the host-based firewall correctly.

The HNACS disclosed herein implements specific computer programs for configuring a host-based firewall installed on a computing device to implement firewall policies referencing hostnames. The computer-implemented method disclosed herein improves the functionality of a computer and provides an improvement in network security technology related to configuring a host-based firewall installed on a computing device to implement firewall policies referencing hostnames as follows: On implementing the method disclosed herein, the HNACS supports configuration of the hostname based firewall policy to provide an IP host-based firewall. Moreover, the HNACS maintains a mapping of the IP address to a hostname, specific to a DNS query from an application deployed on the computing device. Furthermore, the HNACS utilizes the hostname to IP address mapping for configuring correct firewall rules in the hostname based firewall policy. Based on the mapping between the hostname and the IP address corresponding to the hostname, the HNACS, through the use of separate and autonomous computer programs, transforms the hostname based firewall policy by implicitly replacing the hostname incorporated within the hostname based firewall policy with the IP address assigned to the host server, thereby rendering the hostname based firewall policy executable on the conventional host-based firewall installed on the computing device, and thereby allowing the host-based firewall to implement the hostname based firewall policy in a manner similar to the implementation of a host-based firewall policy.

Furthermore, the HNACS ensures the IP addresses mapped to the hostnames is removed when the mapping time expires. The HNACS disclosed herein periodically resolves the hostnames to update the IP addresses in iptables, thereby precluding stale entries in the iptables and blocked connections. Furthermore, the HNACS disclosed herein ensures that the IP address resolved to the hostname by the application is used instead of a system cache or resolving the hostname separately. The computer-implemented method disclosed herein executes faster than Deep Packet Inspection (DPI) based solutions to allow or block access to host servers referenced by hostnames.

The focus of the computer-implemented method and the HNACS disclosed herein is on an improvement to network security technology and computer functionalities, and not on tasks for which a generic computer is used in its ordinary capacity. Rather, the computer-implemented method and the system disclosed herein are directed to a specific improvement to the way the processors in the system operate in terms of defining at least one hostname based firewall policy referencing a host server using a corresponding hostname instead of an IP address assigned to the host server; updating the host based firewall installed on the computing device by incorporating the hostname based firewall policy onto the host based firewall, and rendering the hostname based firewall policy non-implementable on the computing device until the computing device generates a DNS query requesting access to the host server referenced by the hostname based firewall policy; intercepting the DNS query and determining whether the intercepted DNS query comprises the hostname incorporated within the hostname based firewall policy and referencing the host server, on initiation of the DNS query from the computing device; passing the intercepted DNS query to a DNS server and intercepting a DNS response received from the DNS server in response to the intercepted DNS query, on determining that the intercepted domain name system query comprises the hostname incorporated within the hostname based firewall policy for referencing the host server; resolving the intercepted DNS response, and determining, based on the intercepted DNS response, a mapping between the hostname specified in the intercepted DNS query and an IP address corresponding to the hostname; and based on the mapping between the hostname and the IP address corresponding to the hostname, transforming the hostname based firewall policy by implicitly replacing the hostname incorporated within the hostname based firewall policy with the IP address assigned to the host server, thereby rendering the hostname based firewall policy executable on the host based firewall installed on the computing device.

In the computer-implemented method disclosed herein, the design and the flow of data and interactions between the computing devices, the DNS server, and the host servers are deliberate, designed, and directed. The interactions between the computing devices, the DNS server, and the host servers allow the HNACS to configure a host-based firewall installed on a computing device to implement firewall policies referencing hostnames. The steps performed by the HNACS disclosed above requires six or more separate computer programs and subprograms, the execution of which cannot be performed by a person using a generic computer with a generic program. The steps performed by the HNACS disclosed above are tangible, provide useful results, and are not abstract. The hardware and software implementation of the system disclosed herein comprising the HNACS, and at least one processor is an improvement in computer-related and network security technology comprising, for example, micro-segmentation.

Figure 2:
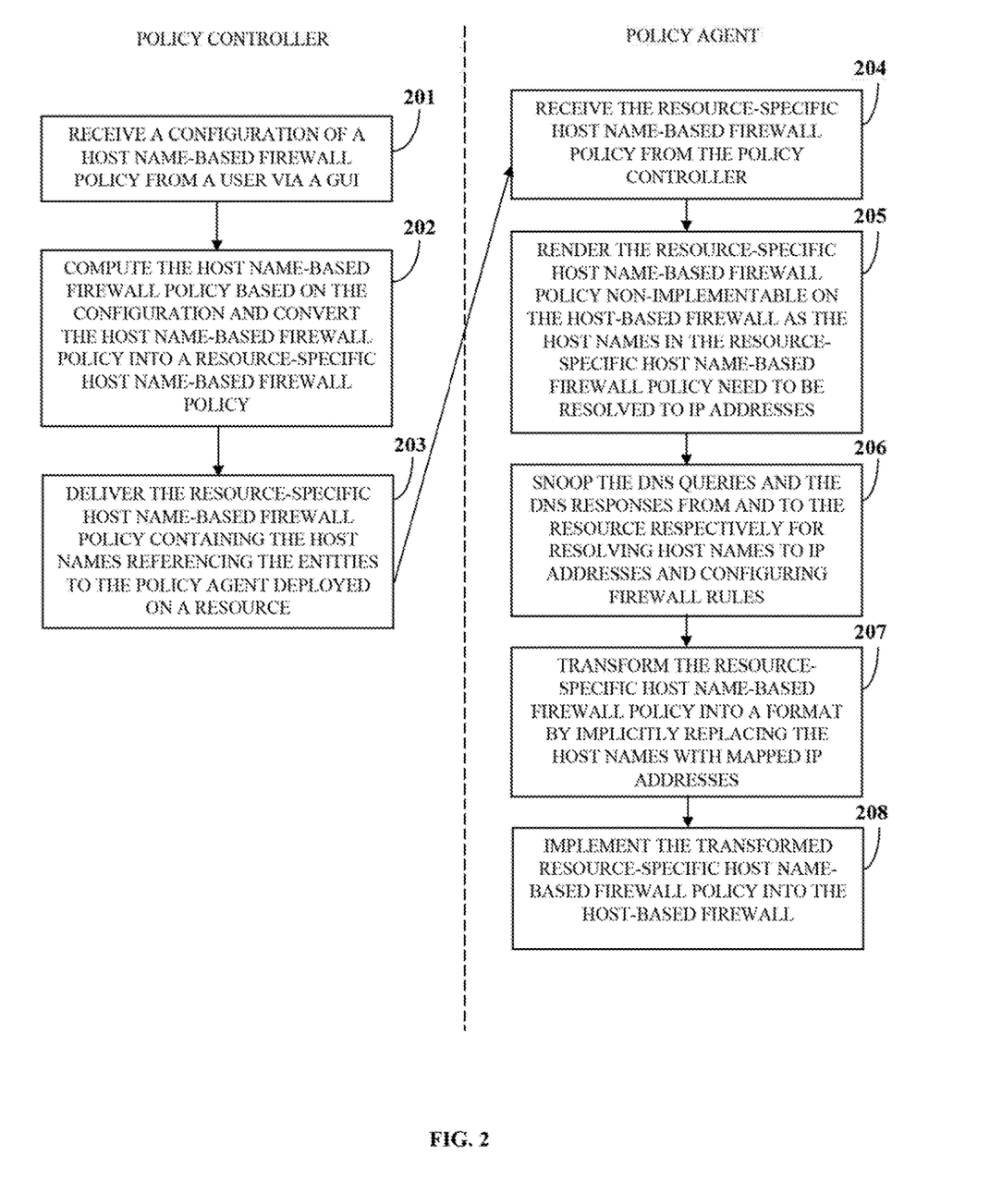
FIG. 2 illustrates a flow diagram comprising the steps performed by a hostname based access configuration system for configuring a host-based firewall installed on a computing device to implement firewall policies referencing hostnames.

FIG. 2 illustrates a flow diagram comprising the steps performed by the hostname based access configuration system (HNACS) for configuring a host-based firewall installed on a computing device to implement firewall policies referencing hostnames. The HNACS allows users to configure firewall policies based on hostnames. In an exemplary implementation, the HNACS comprises a policy controller and a policy agent. The policy controller allows users to configure hostname based firewall policies that allow access between resources and entities represented by hostnames. The resources are, for example, computing devices, on which the hostname based firewall policies are configured by application of firewall rules on the host-based firewalls. The entities are, for example, host servers associated with one or more services, identified by hostnames to which the resources attempt to connect. The policy controller computes and delivers the hostname based firewall policies to the resources for application thereon. In an embodiment, the policy agent is a thin client that runs on each of the resources. The policy agent communicates with the policy controller to download firewall rules appropriate to a particular resource and applies the downloaded firewall rules on the resource.

At the policy controller, the user configures a hostname based firewall policy for allowing access from a resource to one or more entities referenced by hostnames for access using ports and protocols. In an embodiment, the user configures firewall rules of the hostname based firewall policy using a graphical user interface (GUI) provided by the policy controller to allow access from certain resources to certain hostnames referencing the entities. The policy controller receives (at step 201) the configuration of the firewall rules from the user via the GUI, computes(at step 202) the hostname based firewall policy based on the received configuration, and converts the hostname based firewall policy into a resource-specific hostname based firewall policy. The policy controller delivers (at step 203) the resource-specific hostname based firewall policy to a policy agent deployed on a particular resource for application on the host-based firewall deployed on that resource. The resource-specific hostname based firewall policy comprises the hostnames referencing the entities to and from which access should be granted from the resource.

The policy agent implemented on the resource receives (at step 204) the resource-specific hostname based firewall policy from the policy controller. Since the hostnames need to be resolved to internet protocol (IP) addresses, the hostname based firewall rules are not immediately configured on the host-based firewall. The policy agent renders(at step 205) the resource-specific hostname based firewall policy non-implementable on the host-based firewall as the hostnames in the resource-specific hostname based firewall policy needs to be resolved to IP addresses. The host-based firewall expects "port," "protocol," "direction of traffic," "source IP address," and "destination IP address" to configure a firewall rule. Since the hostname based firewall policy configured by the user and delivered from the policy controller has only hostnames instead of IP addresses, the policy agent proceeds to convert the hostnames into IP addresses. That is, the policy agent proceeds to convert the resource-specific hostname based firewall policy into a format which can be used to configure the resource-specific hostname based firewall policy on the host-based firewall deployed on the resource.

To resolve the hostnames to IP addresses and configure the firewall rules of the resource-specific hostname based firewall policy on the host-based firewall deployed on the resource, the policy agent snoops (at step 206) the domain name system (DNS) queries and DNS responses from and to the resource respectively. Applications within the resource that attempt to connect to a host server referenced by a hostname typically initiate a DNS query to the DNS server to resolve the hostname to an IP address. When the policy agent detects the DNS query containing a request for a hostname that is listed on the hostname based firewall policy received from the policy controller, the policy agent checks the corresponding DNS response received from the DNS server and determines the IP address mapping to the hostname. The policy agent then uses the determined IP address to configure the firewall rules of the resource-specific hostname based firewall policy on the host-based firewall. That is, the policy agent transforms (at step 207) the resource-specific hostname based firewall policy into a format based on the mapping between the hostnames and the determined IP addresses corresponding to the hostnames, by implicitly replacing the hostnames with the IP addresses assigned to the entity represented by the hostname.

The policy agent implements (at step 208) the transformed, resource-specific hostname based firewall policy on the conventional host-based firewall. The policy agent matches the hostnames found in DNS requests with hostname inputs from a user using regular expressions or other suitable data structures. A user can input hostnames that allow the user to enable access to multiple portals through a single input. For example, if input from a user requests for access to "*.microsoft.com," the policy agent configures a firewall rule to provide access to "os.microsoft.com," "laptops.microsoft.com," and a host of other websites which end with ".microsoft.com."

The policy agent also maintains a cache of hostname to IP address mappings and the time-to-live values defining expiry times of such mappings. Once the expiry time window for expiry lapses, the policy agent removes the firewall rule corresponding to that IP address specified in the hostname based firewall policy. The policy agent uses the hostname to IP address mappings to configure a firewall rule for the hostname based firewall policy, such that the said firewall rule substitutes the IP address with a corresponding hostname. Furthermore, when there are multiple DNS queries for the same hostname from a resource, the policy agent analyses the DNS responses for all the DNS queries. During the analysis, if the same hostname resolves to multiple IP addresses, the policy agent stores these mappings and their expiry times. The policy agent configures all the IP addresses that map to the hostname to be configured on the host-based firewall. Using the IP address resolved as a part of the DNS query will lead to the correct IP address being configured in the firewall rule, thereby ensuring a packet to pass through the host-based firewall correctly. The policy agent also maintains the expiry times for hostname to IP address mappings and removes the IP addresses from the firewall rules when the corresponding expiry times lapse.

Figure 3:
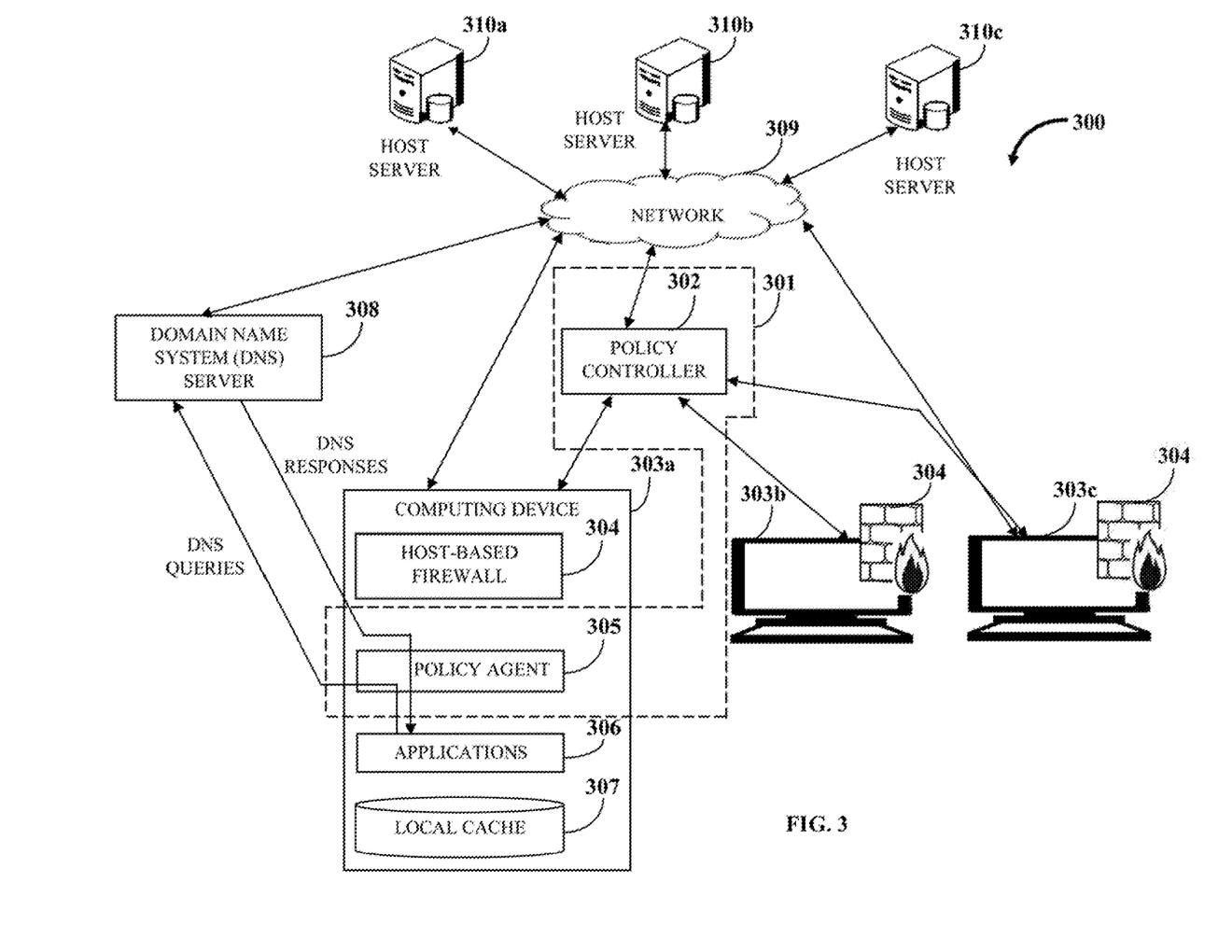
FIG. 3 illustrates a system comprising the hostname based access configuration system for configuring a host-based firewall installed on a computing device to implement firewall policies referencing hostnames.

FIG. 3 illustrates a system 300 comprising the hostname based access configuration system (HNACS) 301 for configuring a host-based firewall 304 installed on a computing device 303a to implement firewall policies referencing hostnames. The system 300 disclosed herein comprises non-transitory computer-readable storage media for storing computer program instructions defined by modules of the HNACS 301, and at least one processor communicatively coupled to the non-transitory computer-readable storage medium for executing the computer program instructions defined by the modules of the HNACS 301 as disclosed in the detailed description of FIG. 4. In an embodiment, the system 300 disclosed herein is implemented in a cloud computing environment. As used herein, "cloud computing environment" refers to a processing environment comprising configurable computing physical and logical resources, for example, networks, servers, storage media, virtual machines, applications, services, and the like, and data distributed over a network 309. The cloud computing environment provides on-demand network access to a shared pool of the configurable computing physical and logical resources. In another embodiment, the HNACS 301 is a cloud computing based platform implemented as a service for configuring a host-based firewall 304 installed on a computing device 303a to implement firewall policies referencing hostnames. As disclosed in the detailed description of FIG. 2, an exemplary implementation of the HNACS 301 comprises the policy controller 302 and a policy agent 305 deployed on each of multiple computing devices 303a, 303b, and 303c also referred to as "resources." The computing devices 303a, 303b, and 303c are, for example, one of desktop computers, tablet computing devices, mobile computers, mobile phones, smartphones, portable computing devices, laptops, personal digital assistants, touch-centric devices, workstations, and portable electronic devices.

In addition to the HNACS 301, the system 300 disclosed herein further comprises a domain name system (DNS) server 308 containing a database of public IP addresses and their associated hostnames. The DNS server 308 resolves or translates the hostnames to IP addresses as requested by the computing devices 303a, 303b, and 303c. The system 300 disclosed herein further comprises multiple host servers 310a, 310b, and 310c, also referred to as "entities," referenced by hostnames. The host servers 310a, 310b, and 310c host services for users. For example, the host servers 310a, 310b, and 310c host one or more of websites, files, images, games, and the like. The computing devices 303a, 303b, and 303c access the host servers 310a, 310b, and 310c via a network 309. In the system 300 disclosed herein, the HNACS 301 interfaces with the DNS server 308 and the host-based firewall 304 on each of the computing devices 303a, 303b, and 303c, and therefore more than one specifically programmed computer system is used for configuring the host-based firewall 304 installed on each of the computing devices 303a, 303b, and 303c to implement firewall policies referencing hostnames.

In the system 300 disclosed herein, each of the computing devices 303a, 303b, and 303c comprises a host-based firewall 304, the policy agent 305 of the HNACS 301, applications 306, and a local cache 307. The host-based firewall 304 is implemented as a hardware component, or a software component, or a combination of a hardware component and a software component on each of the computing devices 303a, 303b, and 303c. The applications 306 communicate with the DNS server 308 to resolve hostnames assigned to the host servers 310a, 310b, and 310c to which the applications 306 request access. The applications 306 generate DNS queries requesting access to one or more of the host servers 310a, 310b, and 310c. In the system 300 disclosed herein, the applications 306 send the DNS queries to the DNS server 308 and receive DNS responses from the DNS server 308 via the policy agent 305 of the HNACS 301. That is, the policy agent 305 intercepts the DNS queries sent to the DNS server 308 and the DNS responses received from the DNS server 308. The policy agent 305 intercepts the DNS queries to determine whether the DNS queries comprise hostnames incorporated with a hostname based firewall policy defined by the policy controller 302 and referencing one or more of the host servers 310a, 310b, and 310c. The policy agent 305 also intercepts the DNS responses received from the DNS server 308 to resolve the DNS responses and determine mappings between the hostnames specified in the DNS queries and the IP addresses corresponding to the hostnames assigned to the host servers 310a, 310b, and 310c. The local cache 307 stores the mappings between the hostnames specified in the DNS queries and the IP addresses corresponding to the hostnames, and time-to-live values assigned to the mappings. The policy agent 305 triggers the storage of the mappings between the hostnames specified in the DNS queries and the IP addresses corresponding to the hostnames, and time-to-live values assigned to the mappings, in the local cache 307.

In the system 300 disclosed herein, the policy controller 302 supports user configuration of the hostname based firewall policy. In an embodiment, the policy controller 302 supports hostname input in the hostname based firewall policy. The policy controller 302 uses the user configuration to derive hostname based firewall policies based on hostnames and sends the hostname based firewall policies to the policy agent 305 deployed on each of the computing devices 303a, 303b, and 303c. The policy agent 305 on each of the computing devices 303a, 303b, and 303c snoops on the DNS queries and the DNS responses communicated between the applications 306 and the DNS server 308 to determine the required hostname to IP address mappings. The policy agent 305 supports hostname inputs and matches the hostnames in the DNS queries and the DNS responses appropriately to allow users to provide a range of hostnames without having to enter each hostname that is a part of the same domain separately. The policy agent 305 also maintains a cache of all the hostname to IP address mappings in the local cache 307 and uses this hostname to IP address mappings to configure firewall rules based on IP addresses for the hostname based firewall policies. The policy agent 305 maintains expiry times for the hostname to IP address mappings and removes the IP addresses from firewall rules when the expiry times lapse. The policy agent 305 uses the DNS response to the DNS queries for determining IP addresses mapped to the corresponding hostnames to ensure that correct IP addresses are configured in the firewall rules of the hostname based firewall policies and to ensure the connections by the applications 306 to the host servers 310a, 310b, and 310c are successful.

Figure 4:
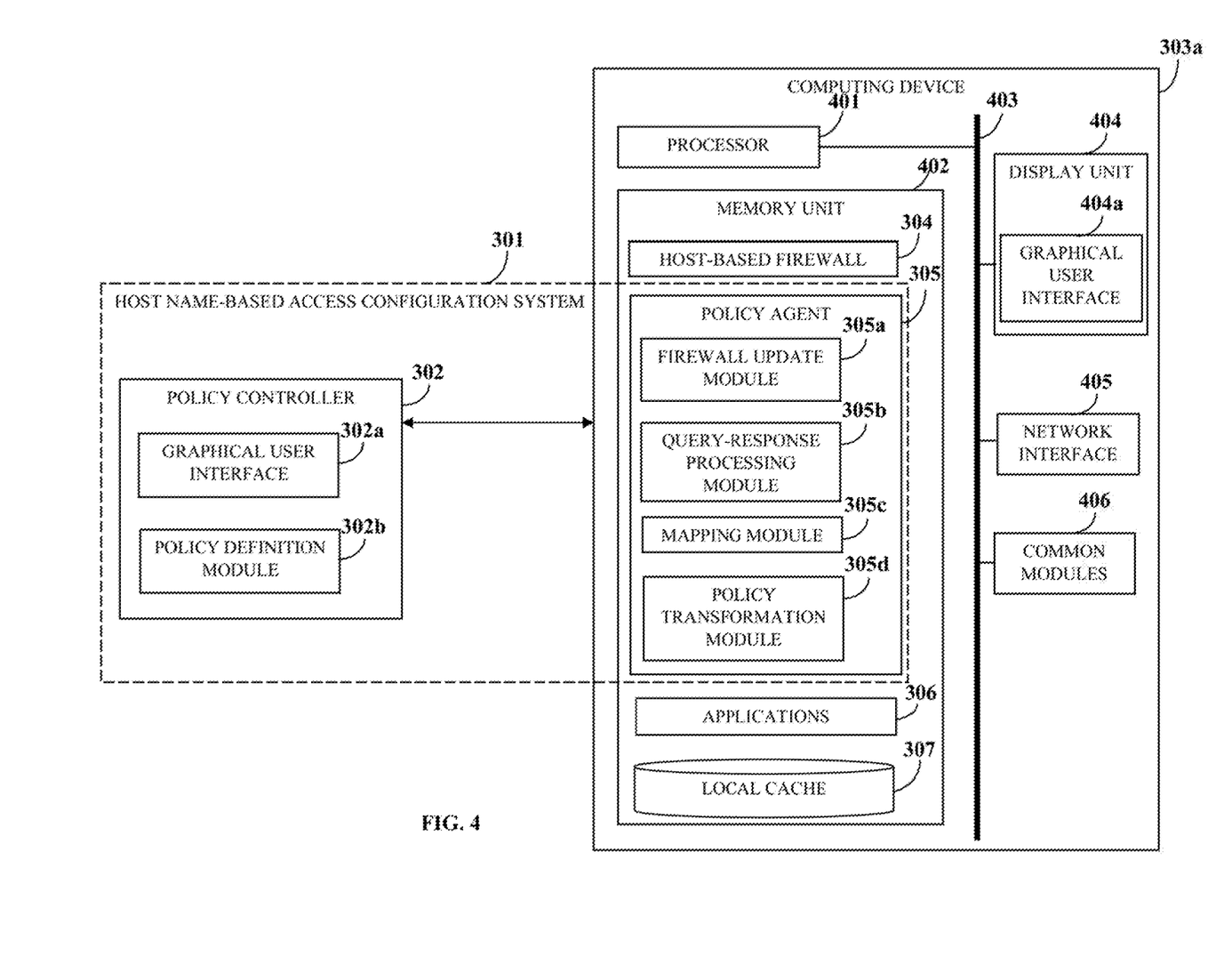
FIG. 4 illustrates an exemplary architectural diagram of a computing device employing the hostname based access configuration system for configuring a host-based firewall installed on the computing device to implement firewall policies referencing hostnames.

FIG. 4 exemplarily illustrates an architectural diagram of a computing device 303a employing the hostname based access configuration system (HNACS) 301 for configuring a host-based firewall 304 installed on the computing device 303a to implement firewall policies referencing hostnames. The computing device 303a is a computer system that is programmable using a high-level computer programming language. In an embodiment, the HNACS 301 is implemented on the computing device 303a using programmed and purposeful hardware. As exemplarily illustrated in FIG. 4, the computing device 303a comprises a non-transitory computer-readable storage medium, for example, a memory unit 402 for storing programs and data, and at least one processor 401 communicatively coupled to the memory unit 402. In an exemplary implementation, the HNACS 301 comprises the policy controller 302 and the policy agent 305 as exemplarily illustrated in FIGS. 3-4. In an embodiment, the policy agent 305 is deployed in the computing device 303a, while the policy controller 302 is deployed external to the computing device 303a. In another embodiment, the policy controller 302 and the policy agent 305 are deployed in the computing device 303a. In an embodiment as exemplarily illustrated in FIG. 4, the memory unit 402 stores computer program instructions and data associated with the host-based firewall 304, the policy controller 302 and the policy agent 305, and the applications 306 on the computing device 303a. In an embodiment, the memory unit 402 also maintains the local cache 307 in the computing device 303a. The memory unit 402 is, for example, a random-access memory (RAM) or another type of dynamic storage device that stores information and instructions for execution by the processor 401. The memory unit 402 also stores temporary variables and other intermediate information used during execution of the instructions by the processor 401. The computing device 303a further comprises a read-only memory (ROM) or another type of static storage device that stores static information and instructions for the processor 401.

The processor 401 is configured to execute the computer program instructions defined by the policy agent 305. In an embodiment, the processor 401 is configured to execute the computer program instructions defined by the policy controller 302. In another embodiment, the policy controller 302 is configured as a processor. The policy controller 302 is implemented by dedicated hardware and in an embodiment, comprises software functions executed by a processor 401. The processor 401 executes the modules, for example, 304, 305, 306, 307, and the like. In various embodiments, the term "module" refers to an implementation that includes software and hardware. Such hardware is, for example, a logic circuit that performs a specified function, and in an alternative embodiment is a processor that executes pre-programmed software instructions to carry out the desired function.

As exemplarily illustrated in FIG. 4, the computing device 303a further comprises a data bus 403, a display unit 404, a network interface 405, and common modules 406. The data bus 403 permits communications between the modules, for example, 401, 402, 404, 405, 406 of the computing device 303a. The display unit 404, via a graphical user interface (GUI) 404a, displays information, user interface elements such as input fields, arrows, icons, and the like., for example, for allowing the deployment of a hostname based firewall policy on the conventional host-based firewall 304 installed on the computing device 303a. The computing device 303a renders the GUI 404a on the display unit 404 for receiving user inputs for deploying the firewall rules of the hostname based firewall policy on the host-based firewall 304 and for receiving hostname inputs to access multiple host servers, for example, 310a, 310b, or 310c exemplarily illustrated in FIG. 3. The GUI 404a is, for example, an online web interface, a web-based downloadable application interface, a mobile-based downloadable application interface, and the like. The display unit 404 displays the GUI 404a. The network interface 405 enables connection of the computing device 303a to the network 309 exemplarily illustrated in FIG. 3. In an embodiment, the network interface 405 is provided as an interface card also referred to as a line card. The common modules 406 comprise, for example, input/output (I/O) controllers, input devices, output devices, fixed media drives such as hard drives, removable media drives for receiving removable media, and the like. Computer applications 306 and programs are used for operating the HNACS 301. The programs are loaded onto a fixed media drive and into the memory unit 402 of the computing device 303a via the removable media drive. In an embodiment, the computer applications 306 and programs are loaded into the memory unit 402 directly via the network 309.

The policy controller 302 comprises a graphical user interface (GUI) 302a and a policy definition module 302b. The GUI 302a is an interactive interface, for example, one of an online web interface, a web-based downloadable application interface, a mobile-based downloadable application interface, and the like. A user enters a configuration for a hostname based firewall policy referencing a host server, for example, 310a, 310b, or 310c, using a corresponding hostname instead of an internet protocol (IP) address assigned to the host server, for example, 310a, 310b, or 310c via the GUI 302a. The policy definition module 302b receives the configuration from the user via the GUI 302a and defines the hostname based firewall policy referencing the host server, for example, 310a, 310b, or 310c using the corresponding hostname instead of the IP address assigned to the host server, for example, 310a, 310b, or 310c. The policy definition module 302b then delivers the hostname based firewall policy to the computing device 303a.

In addition to the policy definition module 302b implemented on the policy controller 302, the HNACS 301 further comprises a firewall update module 305a, a query-response processing module 305b, a mapping module 305c, and a policy transformation module 305d. The firewall update module 305a updates the host based firewall 304 installed on the computing device 303a by incorporating the hostname based firewall policy onto the host-based firewall 304 and rendering the hostname based firewall policy non-implementable on the computing device 303a until the computing device 303a generates a domain name system (DNS) query requesting access to the host server, for example, 310a, 310b, or 310c, referenced by the hostname based firewall policy. In an embodiment, the policy definition module 302b defines the hostname based firewall policy by referencing the host server, for example, 310a, 310b, or 310c, using a combination of the hostname and a predetermined regular expression, where the predetermined regular expression is used for determining a range of hostnames referenced by the hostname based firewall policy. The query-response processing module 305b intercepts the DNS query initiated from the computing device 303a and determines whether the intercepted DNS query comprises the hostname incorporated within the hostname based firewall policy and referencing the host server, for example, 310a, 310b, or 310c. The query-response processing module 305b passes the intercepted DNS query to the DNS server 308 exemplarily illustrated in FIG. 3, and intercepts a DNS response received from the DNS server 308 in response to the intercepted DNS query, on determining that the intercepted DNS query comprises the hostname incorporated within the hostname based firewall policy for referencing the host server, for example, 310a, 310b, or 310c.

The mapping module 305c resolves the intercepted DNS response, and determines, based on the intercepted DNS response, a mapping between the hostname specified in the intercepted DNS query and an IP address corresponding to the hostname. The policy transformation module 305d transforms the hostname based firewall policy based on the mapping between the hostname and the IP address corresponding to the hostname, by implicitly replacing the hostname incorporated within the hostname based firewall policy with the IP address assigned to the host server, for example, 310a, 310b, or 310c, thereby rendering the hostname based firewall policy executable on the host-based firewall 304 installed on the computing device 303a, and thereby allowing the host-based firewall 304 to implement the hostname based firewall policy in a manner equivalent to the implementation of a conventional host-based firewall policy. The policy transformation module 305d transforms the hostname based firewall policy by including a source IP address assigned to the computing device 303a in the hostname based firewall policy.

The mapping module 305c stores the mapping between the hostname specified in the intercepted DNS query and the IP address corresponding to the hostname, as well as a time-to-live (TTL) value assigned to the mapping, in the local cache 307 of the computing device 303a. In an embodiment, the mapping module 305c determines whether the hostname incorporated within the hostname based firewall policy is mapped to multiple destination IP addresses corresponding to respective host servers, for example, 310a, 310b, and 310c, and subsequently stores each mapping between the hostname and each of the destination IP addresses, in the local cache 307, along with a TTL value assigned to each mapping. The mapping module 305c removes the IP address assigned to the host server, for example, 310a, 310b, or 310c, from the hostname based firewall policy on the expiration of time defined by the TTL value assigned to the mapping between the hostname specified in the intercepted DNS query and the IP address corresponding to the hostname. The mapping module 305c periodically verifies the mapping between the hostname specified in the intercepted DNS query and the IP address corresponding to the hostname to identify and provide access to a correct host server, for example, 310a, 310b, or 310c, by implicitly replacing the hostname incorporated within the hostname based firewall policy with an IP address assigned to the correct host server, for example, 310a, 310b, or 310c.

The HNACS 301 is disclosed above as software implemented on the processor 401. In an embodiment, the HNACS 301 is implemented completely in hardware. In another embodiment, the modules, for example, the policy controller 302 and the policy agent 305 of the HNACS 301 are implemented by logic circuits to carry out the desired function. In another embodiment, the HNACS 301 is also implemented as a combination of hardware and software including multiple processors that are used to implement the modules of the HNACS 301. In another embodiment, the modules of the HNACS 301 are implemented, for example, as lookup tables, finite state machines, or using obfuscated software.

The processor 401 retrieves instructions defined by the policy definition module 302b, the firewall update module 305a, the query-response processing module 305b, the mapping module 305c, and the policy transformation module 305d, for performing respective functions disclosed above. The processor 401 retrieves instructions for executing the modules, for example, 302b, 304, 305a, 305b, 305c, 305d, and the like., from the memory unit 402. A program counter determines the location of the instructions in the memory unit 402. The program counter stores a number that identifies the current position in the program of each of the modules, for example, 302b, 304, 305a, 305b, 305c, 305d, and the like. The instructions fetched by the processor 401 from the memory unit 402 are decoded after processing. The instructions are stored in an instruction register in the processor 401. After processing and decoding, the processor 401 executes the instructions, thereby performing one or more processes defined by those instructions.

At the time of execution, the instructions stored in the instruction register are examined to determine the operations to be performed. The processor 401 then performs the specified operations. The operations comprise arithmetic operations and logic operations. The operating system performs multiple routines for performing several tasks required to assign the input devices, the output devices, and the memory unit 402 for the execution of the modules, for example, 302b, 304, 305a, 305b, 305c, 305d, and the like. The tasks performed by the operating system comprise, for example, assigning memory to the modules, for example, 302b, 304, 305a, 305b, 305c, 305d, and the like., and to data used by the HNACS 301, moving data between the memory unit 402 and disk units, and handling input/output operations. The operating system performs the tasks on request by the operations, and after performing the tasks, the operating system transfers the execution control back to the processor 401. The processor 401 continues the execution to obtain one or more outputs.

For purposes of illustration, the detailed description refers to the policy agent 305 of the HNACS 301 being run locally as a single computer system; however the scope of the computer-implemented method and system 300 disclosed herein is not limited to the policy agent 305 being run locally on the computer system via the operating system and the processor 401, but may be extended to run remotely over the network 309 by employing a web browser and a remote server, a mobile phone, or other electronic devices. In an embodiment, one or more portions of the HNACS 301 are distributed across one or more computer systems (not shown) coupled to the network 309.

The non-transitory computer-readable storage medium disclosed herein stores computer program codes comprising instructions executable by at least one processor 401 for configuring a host-based firewall 304 installed on a computing device 303a to implement firewall policies referencing hostnames. The computer program codes implement processes of various embodiments disclosed above and perform additional steps that may be required and contemplated for configuring a host-based firewall 304 installed on a computing device 303a to implement firewall policies referencing hostnames. When the computer-executable instructions are executed by the processor 401, the computer-executable instructions cause the processor 401 to perform the steps of the computer-implemented method for configuring a host-based firewall 304 installed on a computing device 303a to implement firewall policies referencing hostnames as disclosed in the detailed description of FIG. 1. In an embodiment, a single computer program code comprising computer-executable instructions performs one or more steps of the computer-implemented method disclosed in the detailed description of FIG. 1. The processor 401 of the computing device 303a retrieves these computer-executable instructions and executes them.

Technical Advantages

The computer-implemented method and the system disclosed herein support a configuration of firewall policies and access based on hostnames rather than IP addresses. The computer-implemented method and the system disclosed herein supports hostname inputs and match the hostnames in DNS queries and DNS responses appropriately with the IP addresses, thereby allowing users to provide a range of hostnames without having to separately enter each hostname forming a part of the same domain. The computer-implemented method and the system disclosed herein ensure that the correct IP address mapping to the hostname is configured in the host-based firewall so that applications can obtain correct access to host servers. The computer-implemented method and the system disclosed herein use the DNS response obtained as a part of the DNS query to determine the IP address mapped to the hostname, thereby ensuring that the correct IP address is configured in the firewall rule and that the application connection will be successful. The computer-implemented method and the system disclosed herein store and utilize the hostname to IP address mappings for configuring correct firewall rules. The computer-implemented method and the system disclosed herein ensure the IP addresses mapped to the hostnames are removed when the expiry times defined by the time-to-live values of the mapping lapse.

The computer-implemented method and the system disclosed herein ensure that hostname to IP address mapping is periodically checked to evaluate and provide access to the correct host server by configuring the correct IP address. Using the IP address resolved as a part of the DNS query will lead to the correct IP address being configured in the firewall rule, thereby ensuring a packet to pass through the host-based firewall correctly. The computer-implemented method and the system disclosed herein ensure that the IP address resolved to the hostname by the application is used instead of using a system cache or resolving the hostname separately and hence is bound to be substantially accurate. The computer-implemented method and the system disclosed herein performs faster than any DPI-based solutions to allow or block access to domains. Additional technical advantages of the computer-implemented method and the system disclosed herein may be readily apparent to one of ordinary skill in the art from the figures, description, and claims disclosed herein.

What is claimed is:

1. A computer-implemented method for configuring a host-based firewall installed on a computing device to implement firewall policies referencing hostnames, said method comprising:

defining at least one hostname based firewall policy referencing a host server using a corresponding hostname, instead of an internet protocol (IP) address assigned to said host server, wherein said defining further comprises referencing said host server using a combination of said hostname and a predetermined regular expression, wherein said predetermined regular expression is used in determining a range of particular hostnames referenced by said at least one hostname based firewall policy;

updating said host-based firewall installed on said computing device, by incorporating said at least one hostname based firewall policy onto said host-based firewall, and rendering said at least one hostname based firewall policy non-implementable on said computing device until said computing device generates a domain name system (DNS) query requesting access to said host server referenced by said at least one hostname based firewall policy;

in response to initiation of said DNS query from said computing device, intercepting said DNS query and determining whether said intercepted DNS query comprises said hostname incorporated within said at least one hostname based firewall policy and referencing said host server;

in response to determining that said intercepted DNS query comprises said hostname incorporated within said at least one hostname based firewall policy for referencing said host server, passing said intercepted DNS query to a DNS server and intercepting a DNS response received from said DNS server based on said intercepted DNS query;

resolving said intercepted DNS response, and determining, based on said intercepted DNS response, a mapping between said hostname specified in said intercepted DNS query and an IP address corresponding to said hostname, said IP address being a destination IP address assigned to said host server;

based on said mapping between said hostname and said IP address corresponding to said hostname, transforming said at least one hostname based firewall policy by replacing said hostname incorporated within said at least one hostname based firewall policy with said IP address assigned to said host server, rendering said at least one hostname based firewall policy executable on said host-based firewall installed on said computing device, and allowing said host-based firewall to implement said at least one hostname based firewall policy; and in response to an expiration of a predetermined time period associated with said mapping between said hostname and said IP address, removing said IP address from said at least one hostname based firewall policy.

2. The computer-implemented method as claimed in claim 1, wherein the method further comprises storing said mapping between said hostname specified in said intercepted DNS query and said IP address corresponding to said hostname, and a time-to-live value assigned to said mapping, in a local cache of said computing device.

3. The computer-implemented method as claimed in claim 2, wherein the method further comprises determining whether said hostname incorporated within said at least one hostname based firewall policy is mapped to a plurality of destination IP addresses corresponding to respective host servers, and subsequently storing each mapping between said hostname and each of said destination IP addresses, in said local cache, along with a time-to-live value assigned to said each mapping.

4. The computer-implemented method as claimed in claim 2, wherein the removing of said IP address from said at least one hostname based firewall policy is based on said time-to-live value assigned to said mapping between said hostname specified in said intercepted DNS query and said IP address corresponding to said hostname.

5. The computer-implemented method as claimed in claim 1, wherein the transforming of said at least one hostname based firewall policy, further includes including a source IP address assigned to said computing device in said at least one hostname based firewall policy.

6. The computer-implemented method as claimed in claim 1, wherein the method further includes periodically verifying said mapping between said hostname specified in said intercepted DNS query and said IP address corresponding to said hostname to identify and provide access to a correct host server by replacing said hostname incorporated within said at least one hostname based firewall policy with an IP address assigned to said correct host server.

7. A hostname based access configuration system for configuring a host-based firewall installed on a computing device to implement firewall policies referencing hostnames, said system comprising:

a non-transitory computer-readable storage medium for storing computer program instructions defined by modules of said hostname based access configuration system; and at least one processor communicatively coupled to said non-transitory computer-readable storage medium for executing said computer program instructions defined by said modules of said hostname based access configuration system, said modules comprising:

a policy definition module for defining at least one hostname based firewall policy referencing a host server using a corresponding hostname instead of an internet protocol (IP) address assigned to said host server, wherein said policy definition module defines said at least one hostname based firewall policy by referencing said host server using a combination of said hostname and a predetermined regular expression, wherein said predetermined regular expression is used in determining a range of particular hostnames referenced by said at least one hostname based firewall policy;

a firewall update module for updating said host-based firewall installed on said computing device by incorporating said at least one hostname based firewall policy onto said host-based firewall, and rendering said at least one hostname based firewall policy non-implementable on said computing device until said computing device generates a domain name system (DNS) query requesting access to said host server referenced by said at least one hostname based firewall policy;

a query-response processing module for intercepting said DNS query and determining whether said intercepted DNS query comprises said hostname incorporated within said at least one hostname based firewall policy and referencing said host server, in response to initiation of said DNS query from said computing device;

said query-response processing module for passing said intercepted DNS query to a DNS server and intercepting a DNS response received from said DNS server based on said intercepted DNS query, in response to determining that said intercepted DNS query comprises said hostname incorporated within said at least one hostname based firewall policy for referencing said host server;

a mapping module for resolving said intercepted DNS response, and determining, based on said intercepted DNS response, a mapping between said hostname specified in said intercepted DNS query and an IP address corresponding to said hostname, said IP address being a destination IP address assigned to said host server;

a policy transformation module for transforming said at least one hostname based firewall policy based on said mapping between said hostname and said IP address corresponding to said hostname by replacing said hostname incorporated within said at least one hostname based firewall policy with said IP address assigned to said host server, rendering said at least one hostname based firewall policy executable on said host: based firewall installed on said computing device, and allowing said host-based firewall to implement said at least one hostname based firewall policy; and said mapping module removes said IP address from said at least one hostname based firewall policy, in response to an expiration of a predetermined time period associated with said mapping between said hostname and said IP address.

8. The system as claimed in claim 7, wherein said mapping module stores said mapping between said hostname specified in said intercepted DNS query and said IP address corresponding to said hostname, and a time-to-live value assigned to said mapping, in a local cache of said computing device.

9. The system as claimed in claim 8, wherein said mapping module determines whether said hostname incorporated within said at least one hostname based firewall policy is mapped to a plurality of destination IP addresses corresponding to respective host servers, and subsequently stores each mapping between said hostname and each of said destination IP addresses, in said local cache, along with a time-to-live value assigned to said each mapping.

10. The system as claimed in claim 8, wherein said mapping module removes said IP address from said at least one hostname based firewall policy based on said time-to-live value assigned to said mapping between said hostname specified in said intercepted DNS query and said IP address corresponding to said hostname.

11. The system as claimed in claim 7, wherein said policy transformation module transforms said at least one hostname based firewall policy by including a source IP address assigned to said computing device in said at least one hostname based firewall policy.

12. The system as claimed in claim 7, wherein said mapping module periodically verifies said mapping between said hostname specified in said intercepted DNS query and said IP address corresponding to said hostname to identify and provide access to a correct host server by replacing said hostname incorporated within said at least one hostname based firewall policy with an IP address assigned to said correct host server.

13. A non-transitory computer-readable storage medium having embodied thereon, computer program codes comprising instructions executable by a processor for configuring a host-based firewall installed on a computing device to implement firewall policies referencing hostnames, said instructions when executed by said processor cause said processor to:
define at least one hostname based firewall policy referencing a host server using a corresponding hostname instead of an internet protocol (IP) address assigned to said host sever, wherein said definition of said at least one hostname based firewall policy further comprises referencing said host server using a combination of said hostname and a predetermined regular expression, wherein said predetermined regular expression is used in determining a range of particular hostnames referenced by said at least one hostname based firewall policy;
update said host-based firewall installed on said computing device by incorporating said at least one hostname based firewall policy onto said host-based firewall, and render said at least one hostname based firewall policy non-implementable on said computing device until said computing device generates a domain name system (DNS) query requesting access to said host server referenced by said at least one hostname based firewall policy;
in response to initiation of said DNS query from said computing device, intercept said DNS query and determine whether said intercepted DNS query comprises said hostname incorporated within said at least one hostname based firewall policy and referencing said host server;
in response to determining that said intercepted DNS query comprises said hostname incorporated within said at least one hostname based firewall policy for referencing said host server, pass said intercepted DNS query to a DNS server and intercept a DNS response received from said DNS server based on said intercepted DNS query;
resolve said intercepted DNS response, and determine, based on said intercepted DNS response, a mapping between said hostname specified in said intercepted DNS query and an IP address corresponding to said hostname, said IP address being a destination IP address assigned to said host server;
based on said mapping between said hostname and said IP address corresponding to said hostname, transform said at least one hostname based firewall policy by replacing said hostname incorporated within said at least one hostname based firewall policy with said IP address assigned to said host server, rendering said at least one hostname based firewall policy executable on said host-based firewall installed on said computing device, and allowing said host-based firewall to implement said at least one hostname based firewall policy; and
in response to an expiration of a predetermined time period associated with said mapping between said hostname and said IP address, remove said IP address from said at least one hostname based firewall policy.

14. The non-transitory computer-readable storage medium of claim 13, wherein said instructions when executed by said processor further cause said processor to store said mapping between said hostname specified in said intercepted DNS query and said IP address corresponding to said hostname, and a time-to-live value assigned to said mapping, in a local cache of said computing device.

15. The non-transitory computer-readable storage medium as claimed in claim 14, wherein said instructions when executed by said processor further cause said processor to determine whether said hostna me incorporated within said at least one hostname based firewall policy is mapped to a plurality of destination IP addresses corresponding to respective host servers, and subsequently store each mapping between said hostname and each of said destination IP addresses, in said local cache, along with a time-to-live value assigned to said each mapping.

16. The non-transitory computer-readable storage medium as claimed in claim 14, wherein said instructions when executed by said processor further cause said processor to remove said IP address from said at least one hostname based firewall policy based on said time-to-live value assigned to said mapping between said hostname specified in said intercepted DNS query and said IP address corresponding to said hostname.

17. The non-transitory computer-readable storage medium as claimed in claim 13, wherein said transformation of said at least one hostname based firewall policy comprises incorporating a source IP address assigned to said computing device in said at least one hostname based firewall policy.

* * * * *